Patented Dec. 8, 1925.

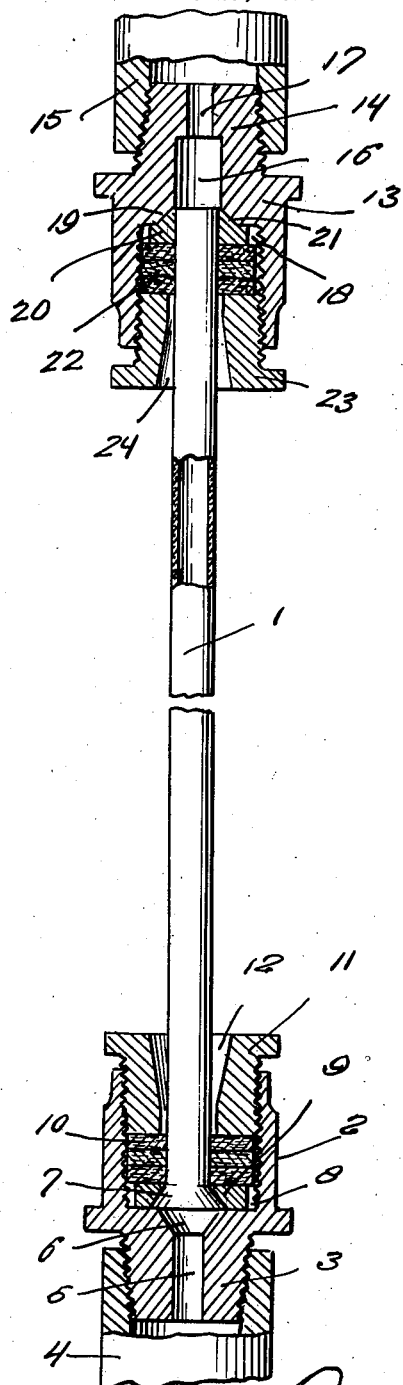

1,565,013

UNITED STATES PATENT OFFICE.

HARRY JORDAN, OF CARBONDALE, PENNSYLVANIA.

WATER GAUGE.

Application filed June 23, 1925. Serial No. 39,085.

*To all whom it may concern:*

Be it known that I, HARRY JORDAN, a citizen of the United States, residing at Carbondale, in the county of Lackawanna and State of Pennsylvania, have invented certain new and useful Improvements in a Water Gauge, of which the following is a specification.

This invention relates to improvements in water gauges for use more particularly on boilers.

One of the important objects of the present invention is to provide a water gauge wherein the glass tube and the usual fittings associated with the respective ends of the tubes are of such construction as to prevent the gaskets which surround the tube at its respective ends in the fittings from working over the ends of the tube and closing the same which as a result causes the tube to break and render the gauge inefficient.

Another important object of the invention is to provide a water gauge wherein the parts comprising the same may be readily and easily assembled or disassembled, the same being further simple in construction, inexpensive and furthermore adapted to the purposes for which the same is designated.

Another object and advantages of the invention will become apparent during the course of the following description.

In the accompanying drawing forming part of this specification and in which like numerals are employed to designate like parts throughout the same:

The figure represents a side elevation of the glass tube, the fittings associated with the respective ends of the tube being shown in section.

In the drawing wherein for the purpose of illustration is shown the preferred embodiment of my invention, the numeral 1 designates the glass tube of the water gauge, the fittings 2 provided for the lower end thereof having the outwardly tapered threaded portion 3 which is adapted for engagement with the upper portion of the elbow 4 which extends from the border not shown.

The bore 5 of the threaded neck portion 3 of the fitting 2 terminates at its upper end in the flared opening 6, the latter being adapted to communicate with the flared lower end 7 of the glass tube 1 which rests on the bottom of the internally threaded socket 8 of the fittings as is clearly illustrated in the drawing.

Surrounding the flared lower end 7 of the tube 1 and resting on the bottom of the socket 8 is the metallic ring or collar 9, the opening thereof being shown so as to cooperate with the flared portion of the glass tube. A series of rubber gaskets 10 are arranged in the socket 8 of the fittings 2 and surround the lower portion of the glass tube 1, the lowermost gasket resting on the upper face of the collar or ring 9. A packet nut 11 is threaded into the upper open end of the socket 8 of the fitting 2 and engages the uppermost gasket in the manner well known in the art. The bore 12 of the packing nut 11 increases gradually in diameter toward the upper end thereof as is also more clearly illustrated in the drawing.

A similar fitting 13 is adapted to be associated with the upper end of the glass tube 1, the externally threaded tapered neck 14 which extends upwardly from the top of this fitting being threaded into the lower end of the elbow 15 which affords a connection between the upper end of the glass tube and the boiler, (not shown). The bore 16 which extends vertically through the lower portion of the neck 14 and the upper portion of the fitting 13 communicates at its upper end with the reduced bore 17 and at its lower end with the internally threaded socket 18. The bore 16 is of a diameter slightly greater than the diameter of the glass tube 1 and the lower end of the bore is countersunk as illustrated at 19.

Surrounding the upper end of the glass tube 1 and within the socket 18 is the metallic ring or collar 20, the same being provided with the beveled portion 21 for cooperation with the countersunk portion 19 of the lower end of the bore 16. Rubber gaskets 22 similar to the gaskets 7 are also arranged in the socket 18 of the fitting 13 and surround the upper portion of the glass tube 1, the uppermost gasket engaging the bottom face of the ring or collar 20. A packing nut 23 similar to the packing nut 11 is threaded in the lower end of the socket 18 and the upper end of the packing nut engages the lowermost of the gaskets 22. The bore 24 of the packing nut 23 is also countersunk as is clearly illustrated in the drawing.

The provision of the metallic collars or rings will prevent any possibility of the rubber gaskets working over the respective ends of the glass tube and closing the same, thus rendering the gauge inoperative and furthermore oftentimes resulting in the breaking of the tube. The bore 16 provides a means for permitting the slight vertical movement of the glass tube so that the expansion of the tube will not cause the breaking of the tube. The flared portion 7 formed on the lower end of the tube 1 cooperates with the countersunk opening 6 of the fitting 2 in preventing any sediment from laying on the bottom of the socket, underneath the tube.

The parts of my improved water gauge are so constructed as to permit the same to be readily assembled and disassembled without the loss of any considerable length of time or labor.

While I have shown the preferred embodiment of my invention, it is to be understood that various changes in the size, shape and arrangement of parts may be resorted to without departing from the spirit or sacrificing any of the advantages of the appended claims.

Having thus described my invention, what I claim as new is:—

1. In a water gauge, the combination with a glass gauge tube, a fitting associated with each end thereof, each fitting being provided with a socket, and a threaded extension, said extension being provided with a bore which registers with the socket, the respective ends of said tube adapted to fit against the bottoms of the respective sockets in registry with the aforementioned bores, a metallic collar surrounding the outermost ends of the glass tube and engaging the bottom of the respective sockets, gaskets in each socket surrounding the respective portions of the glass tube, and packing nuts threaded in said socket.

2. In a water gauge, the combination with a glass gauge tube, a fitting associated with each end thereof, each fitting being provided with a socket, and a threaded extension, said extension being provided with a bore adapted to register with the socket, the lower end of the glass tube being flared outwardly, the lower fittings having the upper end of the bore formed in its extension countersunk to communicate with the outwardly flared lower end of the glass tube, a metallic collar surrounding each end of the glass tube and engaging the bottom of the respective sockets, gaskets in each socket surrounding the respective portions of the glass tube, and packing nuts threaded in said sockets.

3. In a water gauge, the combination with a glass gauge tube, a fitting associated with each end thereof, each fitting being provided with a socket, and a threaded extension, each extension having its bore communicating with the respective sockets, the bore in the extension of the upper fitting being of a diameter slightly greater than the diameter of the glass tube for receiving the upper end of the latter, a metallic collar surrounding the outermost ends of the glass tube and engaging the bottom of the respective sockets, gaskets in each socket surrounding the respective portions of the glass tube, and packing nuts threaded in the sockets of the respective fittings.

In testimony whereof I affix my signature.

HARRY JORDAN.